May 15, 1951 W. C. HIGBY 2,553,455
FERTILIZER SPREADING MACHINE
Filed July 12, 1946 4 Sheets-Sheet 1

Inventor
Willard C. Higby
By
Attorney

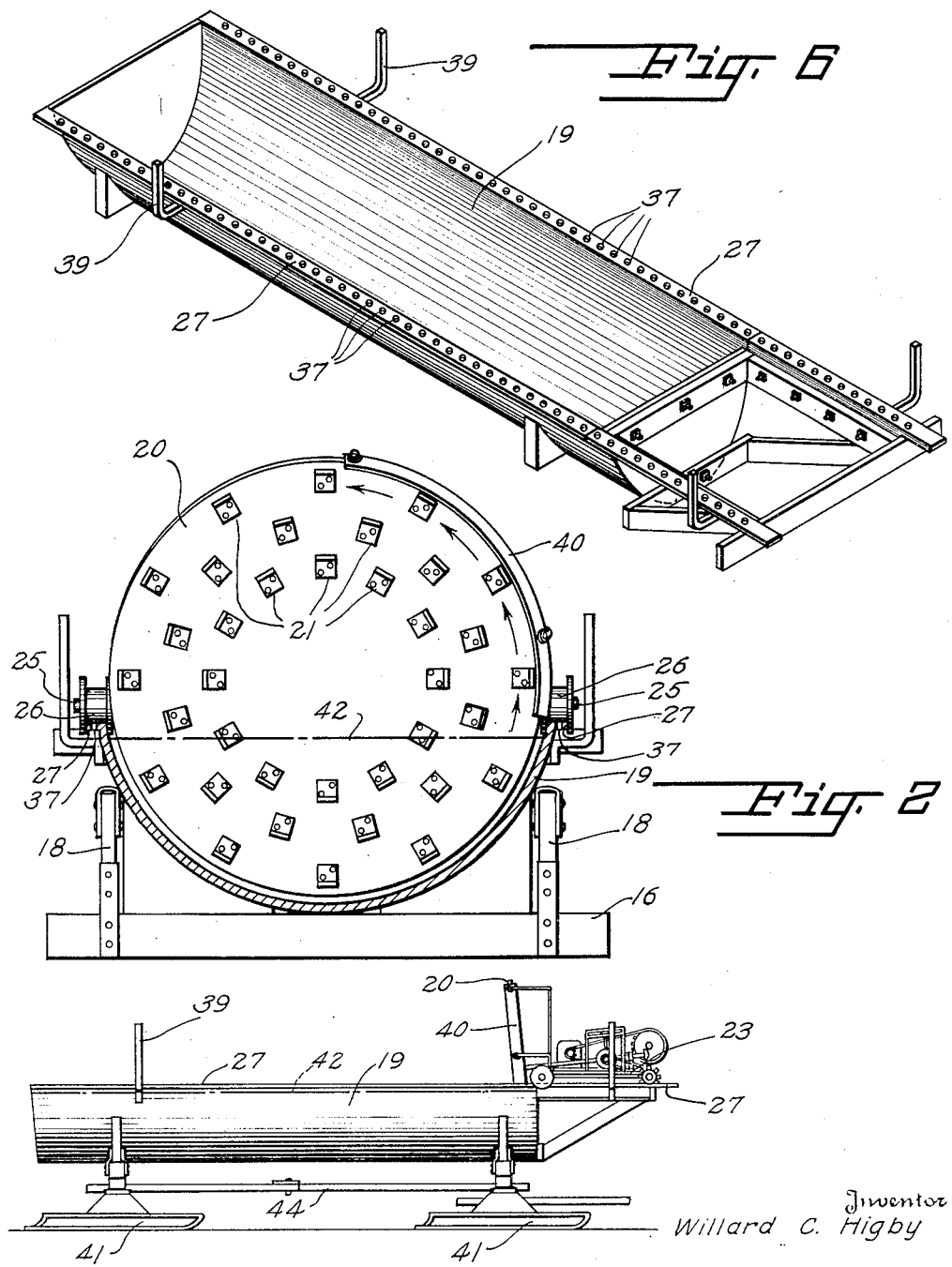

May 15, 1951 W. C. HIGBY 2,553,455
FERTILIZER SPREADING MACHINE
Filed July 12, 1946 4 Sheets-Sheet 3
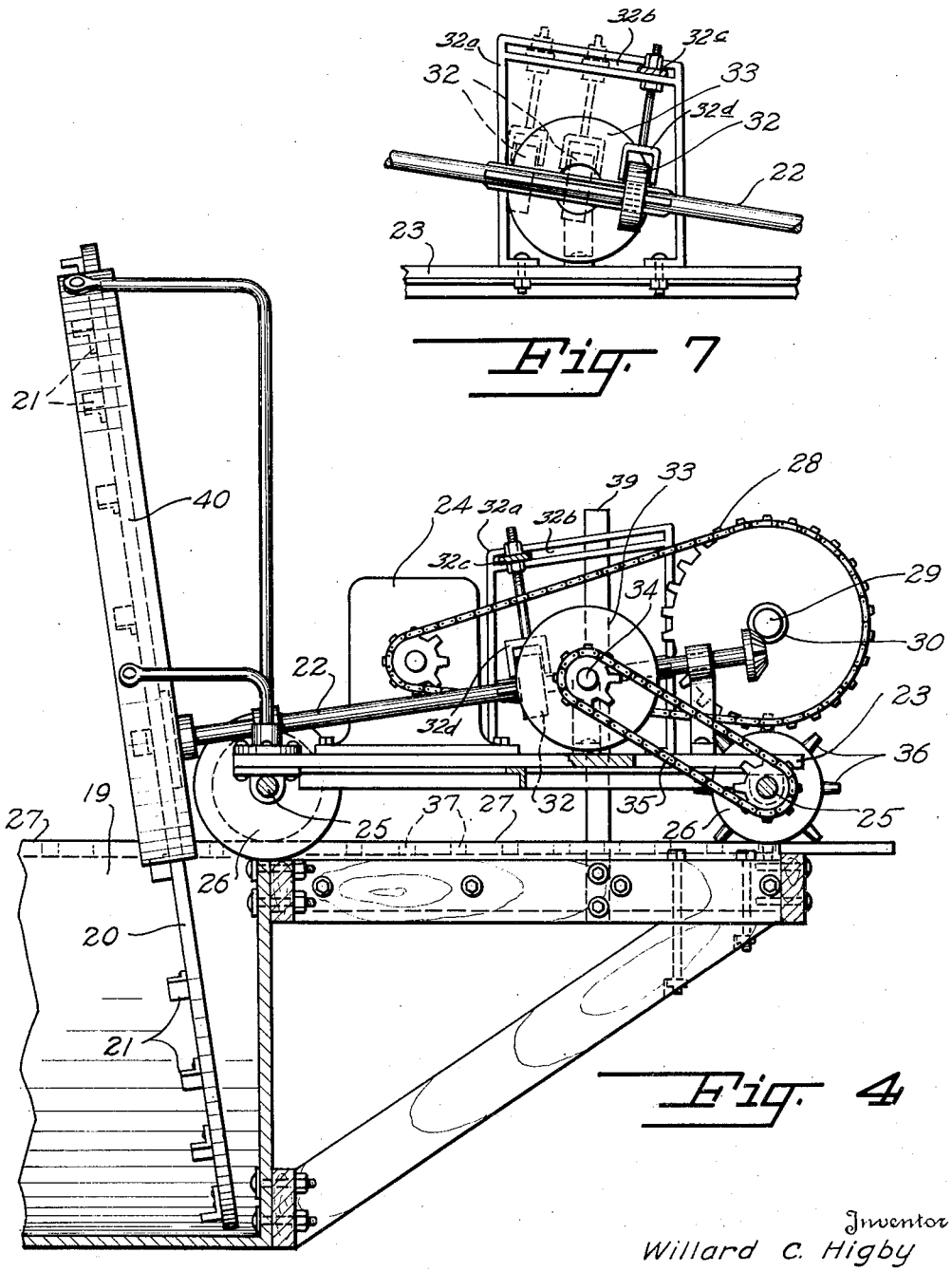

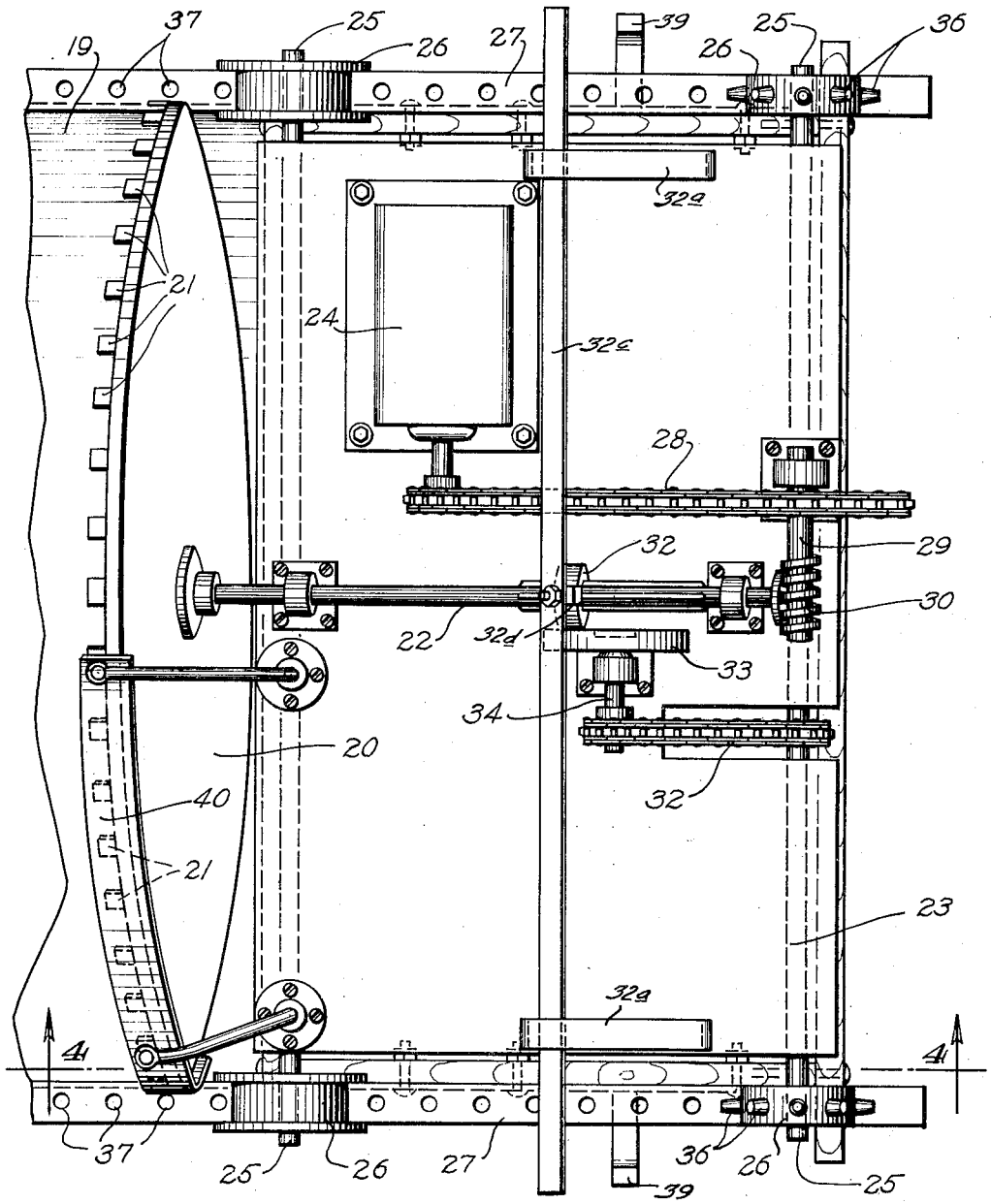

UNITED STATES PATENT OFFICE 2,553,455

FERTILIZER SPREADING MACHINE

Willard C. Higby, Lowville, N. Y., assignor, by direct and mesne assignments, to Willard C. Higby, Lowville, and Willis Higby, Pulaski, N. Y.

Application July 12, 1946, Serial No. 683,079

11 Claims. (Cl. 275—8)

My invention relates to improvements in manure and other fertilizer spreading devices, the characteristic features of which reside in the provision of a trough-like, water-tight container which can be transported over the farm land either on a wheeled truck or on sleigh runners. This container preferably is water-tight and is filled from end to end with manure to be thrown by a spreader wheel over one side of the container as the vehicle proceeds.

The side edges of the container are provided with tracks for a small car driven by an engine thereon while revolving the spreader and gradually emptying the container which has a half round bottom to fit the spreader wheel.

These and other features and advantages of the invention will be understood from the following description aided by the accompanying drawings wherein:

Figure 2 is a view in cross section taken on a plane along line 2—2 of Figure 1;

Figure 3 is a view similar to Figure 1 but in smaller scale with the machine mounted on runners;

Figure 4 is a side view in larger scale of the top car carrying the entire operating mechanism;

Figure 5 is a top plan view of Figure 4;

Figure 6 is a view in top perspective of the box or container with the operating mechanism removed;

Figure 7 is a detail side view of the gearing and speed change connection between the disc shaft and the carriage drive.

In the drawings like numerals refer to the same details in the different views.

Figure 1:
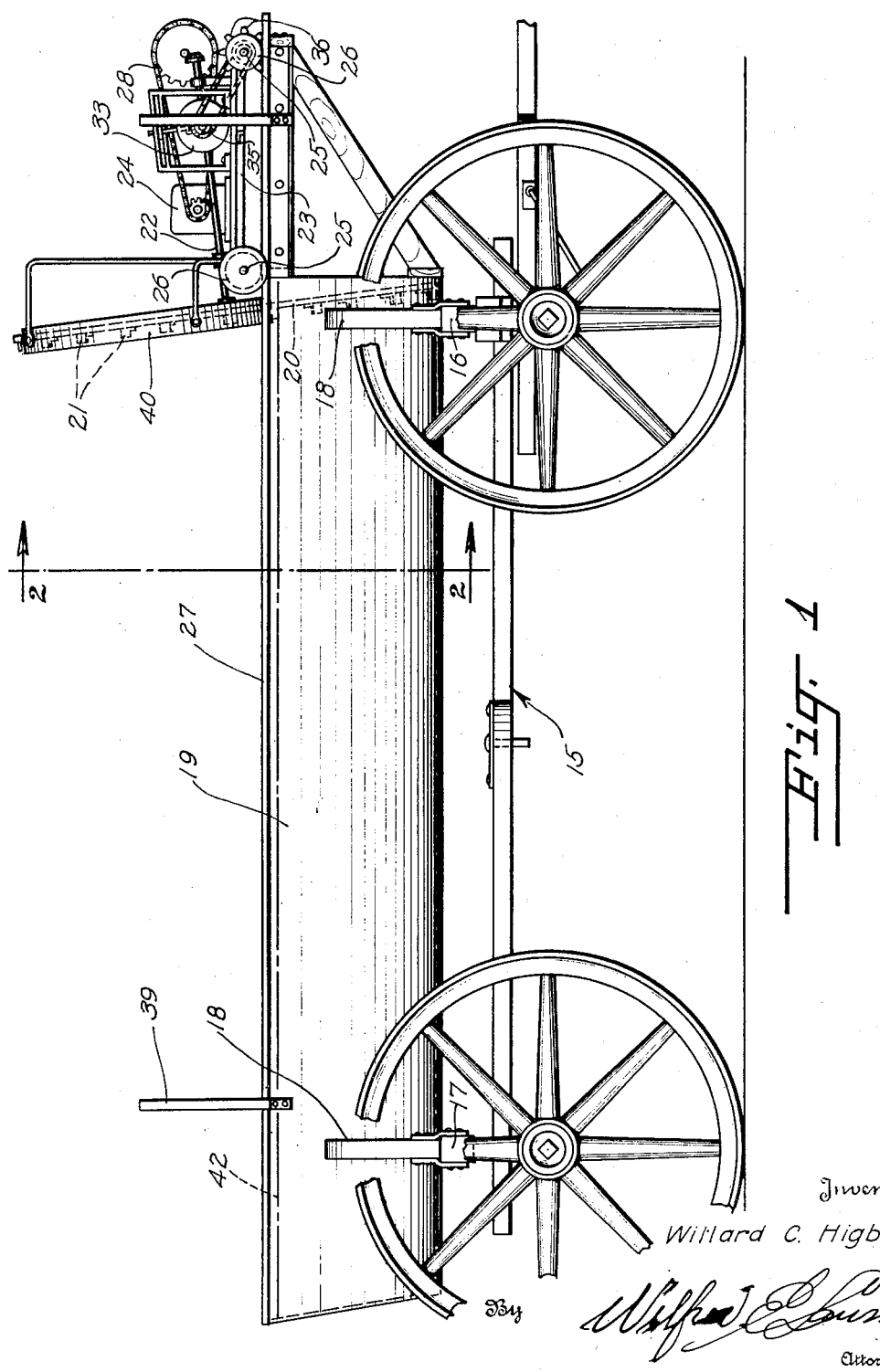
Figure 1 is an assembly view of the spreader unit machine in side elevation on a wheeled truck.

This machine is carried on an ordinary wheeled truck 15 having front and rear bolsters 16, 17 with stakes 18 fitting the width of a trough-shaped, water-tight box or container 19 which extends the entire length of the truck. This box is semicircular in cross section and the bottom half has a spreader wheel 20 lowered thereinto to contact with the manure therein. The spreader wheel is provided on its rear flat surface with a great number of inclined pins or pegs 21 for cutting up and loosening the wet or dry manure stored in said box or container 19, while traveling rearwardly therein and throwing it over the side edge of the box 19. The spreader wheel 20 is tilted rearwardly and secured on a spindle 22 which is mounted in an inclined position on top of a small car or carriage 23 on which is mounted a small engine 24.

The car 23 consists of a frame with front and rear axles 25, each with a pair of traction wheels 26 preferably flanged to run on tracks 27, which extend along the top edges of the box 19. By means of a sprocket gear and chain drive 28 between the engine 24 and an auxiliary shaft 29 supported across and upon the car 23, together with a worm gear 30 between the auxiliary shaft 29 and spreader spindle 22 the revolving speed of the spreader wheel is reduced to the desired amount.

In order to move the spreader wheel 20 along the manure bed 42 in the box 19, a friction gearing is provided between the spindle 22 and one of the car wheel shafts 25, consisting of a wheel 32 keyed on the spreader spindle 22 for sliding movement thereon, see Figure 7, and a friction disk 33 with one side face of which the wheel is in frictional contact. This disk is revolvably mounted on the car 23 on a short shaft 34. Another sprocket wheel and chain drive 35 connects the disk shaft 34 with the wheel axle 25 thereby to propel the car with all the machinery along the side tracks 27.

At opposite sides of the carriage are mounted two frames 32a, each of which is formed at its top to provide an inclined guide slot 32b which extends in the direction of the length of the box. Extending transversely across the carriage and engaged at its ends in the slots 32b of the two oppositely positioned frames 32a, is a slide bar 32c to which is attached an end of a hanger fork 32d which engages across the upper part of the wheel 32 as shown in Figure 7. As will be readily apparent, the forward or rearward movement of the bar 32c will effect the shifting of the wheel 32 on the spindle 22 so that the position of contact of the wheel with the face of the disk 33 will be altered.

To assure accurate and sure grip of the driven car wheels with the supporting tracks, they are provided with cogs 36 adapted for engagement with corresponding notches or recesses 37 on top of the side tracks 27.

It will now be evident that with the friction roller 32 located near the periphery of the disk 33 as shown in Figures 4 and 7, the car wheels will be made to run faster than when the roller is set near the axis of disk 33 and with the roller on the opposite edge of the disk periphery the direction of travel will be reversed.

Secured to the tracks or to the side of the container at the two ends thereof are upstanding stop arms 39. These arms are vertically disposed and, as shown in Figure 5, the bar 32c is of a length to extend outwardly beyond the sides of the box or beyond the tracks so as to strike the stop arms 39 when the carriage reaches the limit of its movement toward either of the two ends of the container. These arms 39 not only function to effect the stopping of the movement of the carriage toward the adjacent end of the container but they also effect the reversal of the driving mechanism by shifting the bar 32c from the ends of the guide slots 32b in which it is resting to the opposite ends thereby also effecting the shifting of the wheel 32 across the face of the friction disk 33 from one side of the same to the other. In this manner the direction of drive for the wheels 26 which carry the lugs 36 will be reversed and the direction of movement of the carriage will also be reversed.

With the spreader wheel running in the direction indicated by arrows in Figure 2, the manure will be thrown out towards the left of said figure, and in order that none of the manure shall get out on the opposite side, a guard or fender 40 is provided over the right upper quarter of the spreader wheel 20 as shown in said figure.

In Figure 3 is shown how the spreader machine is fitted with sleigh runners 41 instead of wheels for winter work. In that case the entire box 19 with car 23 and machinery is merely lifted off the wheeled truck 15 and placed on the sleigh 44.

Some general observations should be noted:

The box or fertilizer container 19 with closed ends and half-cylindrical bottom, is made of metal, preferably steel, and is perfectly watertight right up to the straight top edges, which carry the rails or tracks 27 for the cog wheels 26 of the carriage 23 running thereon and carrying all the machinery.

During operation, none of the manure or other fertilizer 42 is moving except that portion thereof directly in contact with the spreader wheel 20, see Figure 1, which is thrown to one side over the track 27. No chains to set the fertilizer in motion are used.

Due to the fact that the mechanism unit consisting of the box 19, carriage 23 with engine 24, the spreader 20, and all gearing therefor fits between the bolster stakes on a sleigh or wagon, it can be used on any such vehicle of suitable size and merely be shifted from one vehicle to another without any alterations.

I claim:

1. A scattering unloader comprising a long open top material container having parallel, longitudinal top edges constituting tracks, a carriage disposed over the top of the container, supporting wheels for said carriage resting upon said tracks for movement of the carriage from one end of the container to the other, a scattering disk supported on the carriage for rotation and extending downwardly into the container in transverse relation to the container, the disk being moved lengthwise of the container with the carriage, a power unit supported upon the carriage, and a driving connection between the power unit and the disk.

2. A scattering unloader of the character stated in claim 1, with a driving connection between the power unit and a wheel of the carriage for effecting movement of the carriage longitudinally of the container.

3. A scattering unloader comprising a long open top material container of arcuate cross section and adapted to be supported on a ground engaging carrying means, said container having straight parallel top edges constituting tracks, a carriage structure disposed above the open top of the container and comprising a platform and supporting wheels, said supporting wheels resting upon said tracks for movement of the platform longitudinally of the container, a shaft rotatably supported upon the platform to extend longitudinally of the vertical longitudinal center of the container, a disk secured to said shaft and extending downwardly into the container into close proximity with the arcuate wall thereof, said disk having a plurality of material pick-up elements secured to a face thereof, a power unit carried upon the platform, and a driving connection between the power unit and said shaft for imparting rotary motion to the disk as the carriage is moved lengthwise of the container.

4. A scattering unloader of the character stated in claim 3, with a shaft extending transversely of the container and connecting to opposite wheels of the carriage, and a driving connection between the power unit and the last mentioned shaft for driving the carriage wheels connected therewith.

5. A scattering unloader of the character stated in claim 3, with a shaft extending transversely of the container and connecting to opposite wheels of the carriage, and a driving connection between the power unit and the last mentioned shaft for driving the carriage wheels connected therewith, said tracks being provided with apertures spaced longitudinally of the tracks and said last mentioned wheels having peripheral cogs engageable in said apertures for establishing a positive traction connection between the tracks and said last mentioned wheels.

6. A scattering unloader of the character stated in claim 3, wherein the driving connection between said disk shaft and the power unit includes a means for reversing the direction of rotation of the disk.

7. A scattering unloader of the character stated in claim 3, wherein the driving connection between the power unit and said disk shaft includes a driven friction disk, a friction wheel carried upon and keyed to the shaft with which the first disk is connected and having contact with the face of the friction disk, said wheel being slidable upon its supporting shaft to change its point of contact with the friction disk on a diametrical line extending from one side of the friction disk to the other.

8. A scattering unloader comprising a long open top material container of arcuate cross section adapted to be supported upon a ground engaging carrying means, said container having straight parallel longitudinal edges constituting tracks, a carriage supported over the container and including a platform and wheels at opposite sides of the platform supported upon said tracks whereby the carriage may be moved from one end of the container to the other, a shaft rotatably supported upon the platform and extending longitudinally of the container in the vertical plane of the longitudinal center of the container, a scattering disk carried by said shaft and having its periphery extending down into and substantially conforming to the contour of the container, a friction disk rotatably supported on the platform at one side of and adjacent to said shaft, a power unit supported upon the platform, a driving connection between the power unit and said shaft, a friction wheel slidably supported on and keyed to said shaft and having peripheral contact with a face of said friction disk, a driving connection between the friction disk and one of said wheels, and means for automatically shifting the friction wheel across the face of the friction disk from one side of the friction disk center to the other upon the arrival of the carriage at either end of the container.

9. A fertilizer spreader unit adapted to be carried on top of a suitable vehicle, said unit consisting of a half cylindrical box having an open top, tracks along the top edges of the box, a carriage having traction wheels resting on said tracks for movement of the carriage lengthwise of the box, a spreader wheel supported on the carriage for revolution on an axis directed longitudinally of the box, said wheel having a substantial portion of the lower part theereof disposed in and transversely of the box, and means for effecting rotation of said wheel while the carriage is moving longitudinally on the tracks.

10. A spreader unit as set forth in claim 9, wherein said spreader wheel is of a diameter to substantially fill the lower half of the box transversely, a plurality of fertilizer disintegrating pegs projecting from the rear surface of the spreader wheel, said rotating means for said wheel consisting of a power unit supported on the carriage and speed reducing gears between said power unit and the wheel, the wheel axis having a slightly downward inclination rearwardly, and means for directing laterally of the box material picked up by and thrown off from the wheel.

11. A scattering unloader adapted to be carried on a vehicle, said unloader comprising a long open top material container of substantially semi-circular cross section, a carriage, wheels carried by the carriage at opposite sides thereof, wheel supporting tracks disposed along opposite sides of the container upon which the wheels of the carriage rest to support the carriage over and for movement longitudinally of the container, a material scatterer wheel, a shaft supporting the wheel for turning on an axis above and substantially parallel to the plane of the top of the container and directed longitudinally of the latter, said wheel being positioned in a substantially vertical plane whereby a portion of the wheel depends into the container transversely of the length thereof so that the wheel when rotated discharges material from the container over a longitudinal edge of the latter transversely to the path of movement of the vehicle, the wheel being moved lengthwise of the container by and with the carriage while turning in the container, and means for rotating the wheel as it is being moved with the carriage.

WILLARD C. HIGBY.

REFERENCES CITED

The following references are of record in the file of this patent:

UNITED STATES PATENTS

| Number | Name | Date |
|---|---|---|
| 477,325 | Daniels | June 21, 1892 |
| 965,936 | Quickel | Aug. 2, 1910 |
| 1,507,054 | Folsche | Sept. 2, 1924 |
| 2,393,932 | Petroe | Jan. 29, 1946 |
| 2,430,020 | Johnson | Nov. 4, 1947 |